United States Patent
Choi et al.

(10) Patent No.: US 7,412,164 B2
(45) Date of Patent: Aug. 12, 2008

(54) PHOTOELECTRIC CROSS-CONNECT SYSTEM

(75) Inventors: Jeong-Seok Choi, Seoul (KR); Yun-Je Oh, Yongin-shi (KR); Jun-Ho Koh, Suwon-shi (KR); Chang-Hyun Lee, Seoul (KR); Byung-Jik Kim, Songnam-shi (KR); Jeong-Rok Park, Suwon-shi (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 1071 days.

(21) Appl. No.: 10/425,699

(22) Filed: Apr. 29, 2003

(65) Prior Publication Data

US 2003/0202466 A1    Oct. 30, 2003

(30) Foreign Application Priority Data

Apr. 30, 2002  (KR) ............................... 2002-23826

(51) Int. Cl.
    *H04B 10/00* (2006.01)
(52) U.S. Cl. ........................................................ 398/4
(58) Field of Classification Search ................. 398/4–6, 398/50, 56, 135; 370/220, 228, 229
    See application file for complete search history.

(56) References Cited

U.S. PATENT DOCUMENTS

| | | | | |
|---|---|---|---|---|
| 5,903,544 A | * | 5/1999 | Sakamoto et al. | 370/218 |
| 5,982,746 A | * | 11/1999 | Hanson et al. | 370/220 |
| 6,498,670 B2 | * | 12/2002 | Yamashita et al. | 398/209 |
| 2004/0013433 A1 | * | 1/2004 | Alexander et al. | 398/91 |

* cited by examiner

*Primary Examiner*—Shi K. Li
*Assistant Examiner*—Quan-Zhen Wang
(74) *Attorney, Agent, or Firm*—Cha & Reiter, LLC (57) ABSTRACT

A photoelectric cross-connect system for an optical-communication system minimizes service recovery time when an error is generated. A plurality of nodes are connected by an optical-transmission line wherein each nodes automatically recognizes a data rate of an input signal and communicates over a redundant channel with an adjacent node when there is a certain type of error. An optical-receiving unit receives an optical signal performs O/E conversion. A main optical-transmitting unit recovers clock and data signals according to the converted signal and sets a data rate according to the converted signal for subsequent transmission; a redundant optical-transmitting unit recovers a clock and data according to the converted signal and sets a data rate according to the converted signal for subsequent transmission A switch provides selectively connection state between the optical-receiving unit and the main optical-transmitting unit and between the optical-receiving unit and the redundant optical-transmitting unit.

6 Claims, 8 Drawing Sheets

PHOTOELECTRIC CROSS-CONNECT SYSTEM

CLAIM OF PRIORITY

This application claims priority to an application entitled "PHOTOELECTRIC CROSS-CONNECT SYSTEM," filed in the Korean Intellectual Property Office on Apr. 30, 2002 and assigned Ser. No. 2002-23826, the contents of which are hereby incorporated by reference.

BACKGROUND OF THE INVENTION

1. Field of the Invention

The present invention generally relates to an optical-communication network comprised of a plurality of nodes and, in particular, to a photoelectric cross-connect system included in each node.

2. Description of the Related Art

Figure 1:
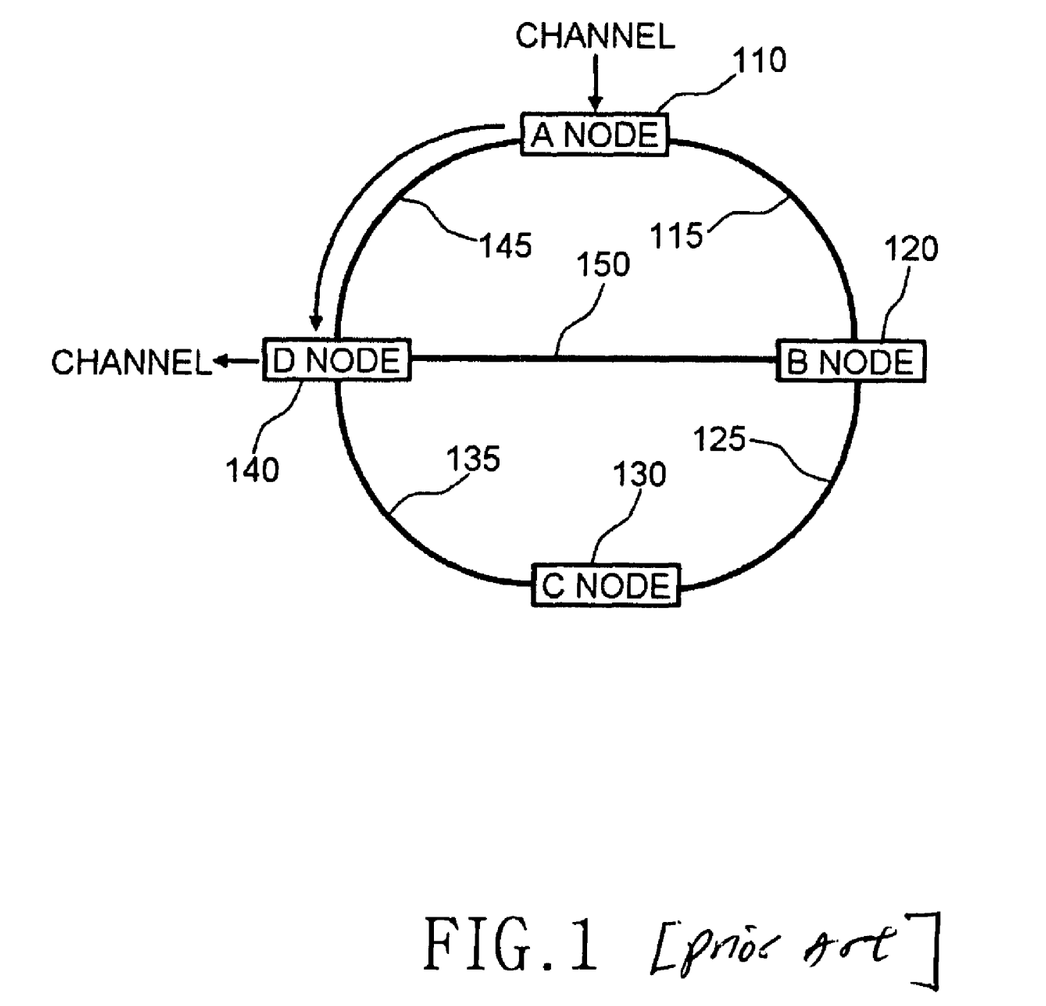
FIG. 1 is a structure illustrating a conventional mesh structure of an optical-communication network designed to maintain transparency.

In general, an optical-communication network comprises a back-up optical transmission path in case the active optical-transmission line malfunctions or is down due to errors thereby providing uninterrupted transmission. FIG. 1 is an architecture illustrating a conventional mesh structure of an optical-communication network. As shown, the conventional optical network includes four nodes, 110, 120, 130, and 140, connected using a bi-directional optical-transmission line, first line 115, second line 125, third line 135, fourth line 145, and fifth line 150. In this type of network, one node always has at least one optical-transmission path to the other nodes. The optical-transmission line is an optical fiber connected between two nodes, and the optical-transmission path is a path of the channel transmitted between two nodes, namely a path covering the nodes and the optical fiber. In addition, a photoelectric cross-connect system included in each node 110, 120, 130, or 140 has a data-rate recognizing function and a clock/data recovery function, thus maintaining transparency for a plurality of specific data rates. That is, each of the nodes 110, 120, 130, and 140 is capable of automatically recognizing an unknown data rate of an input channel and recovering a clock and data.

The node (A) 110 is connected to adjacent nodes (D) 140 and (B) 120 through the respective optical-transmission lines 145 and 115, and communicates with the node (D) 140 through a main channel allocated to the node (D) 140 and the node (B) 120. Here, the main channel allocated between the node (A) 110 and the node (D) 140 is the shortest optical-transmission path between the two nodes, and transmitted in the normal operation through the fourth optical transmission line 145 connected between the node A (110) and node D (140). In the same manner, the main channel allocated between the node A (110) and the node B (120) is a channel transmitted through the first optical-transmission line 115 connected between the node A (110) and the node B (120).

In the normal operation, when a channel having the node D (140) as a destination is inputted externally, the node A (110) transmits through the fourth optical-transmission line 145 allocated to the node D (140). The node D (140) receives data through the main channel and transmits the data to a corresponding node through its own channel.

Figure 2:
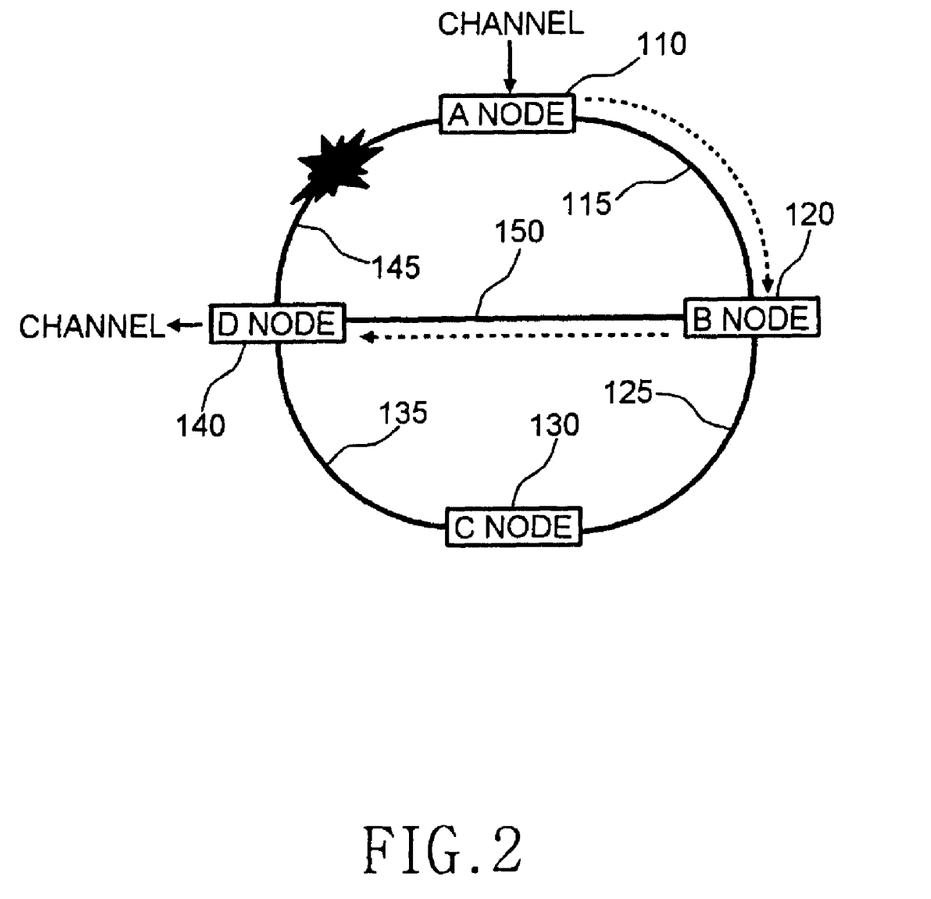
FIG. 2 is an explanatory view showing a state where an error is generated in a first optical-transmission line of FIG. 1.

FIG. 2 is an explanatory view showing a state when an error is generated in the fourth optical-transmission line 145 of FIG. 1. As shown in FIG. 2, if the fourth optical-transmission line 145 between the node A (110) and the node D (140) is down and then data destined to the node D (140) is externally inputted, the node A (110) cannot use the main channel allocated to the node D 140. In this case, the node A (110) receives information that the fourth optical-transmission line 145 has an error through a supervisory channel allocated to the node D (140), then notifies the error through a supervisory channel allocated to the node B (120). The node B (120) in turn switches the main channel allocated to the node D 140 to the back-up channel and communicates with the node D (140) through the back-up channel. The back-up channel outputted from the node A (110) reaches the node D (140) in the order of the first optical-transmission line 115, the node B (120) and the fifth optical-transmission line 150.

Note that the time for recovering the service using the back-up channel at a given node satisfies the following equation [error generation recognition time (a few ten μs)]+ [switching time (a few ten ms)]+[error generation notification time through supervisory channel (a few ten ms)]+[data recovery time of redundant channel (a few hundred ms)]= [service recovery time (a few hundred ms)].

As such, the recovery time for N nodes is then increased by N multiplied by the recovery time calculated above. Note that the data-rate recognition time of an input channel takes most of the data-recovery time when using the back-up channel. Such data-rate recognition is performed at the input of a channel having different data rates. If the data rate has been recognized previously, the corresponding back-up channel can output the data directly without wasting time in trying to recognize the data rate. However, if a channel with a different data rate from the previously-recognized rate is received, the time to recognize the data rate is required.

As described above, the conventional optical network has a disadvantages in that, when an error is generated in the optical-transmission line, it takes a long time to recover the service through the back-up channel.

SUMMARY OF THE INVENTION

It is, therefore, an object of the present invention to provide a photoelectric cross-connect system that can minimize a service-recovery time when an error is generated in a mesh structure of the optical-communication network designed to maintain transparency.

According to one aspect of the invention, there is provided a photoelectric cross-connect system in an optical-communication system having an optical-transmission line connected between adjacent nodes, where each node recognizes the data rate of an input channel automatically, and includes a redundant channel for communicating with a different adjacent node when disconnected from the adjacent node. The system includes an optical-receiving unit for receiving an input electrical signal and converting into an electric signal; a main optical-transmitting unit, allocated to the optical-receiving unit, for recovering a clock and data according to the inputted electric signal and for setting up a data rate used in the main channel according to the electric signal; a redundant optical-transmitting unit, allocated to the main optical-transmitting unit, for recovering a clock and data according to the inputted electric signal and for setting up the data rate used in the redundant channel according to the electric signal; a switch for adjusting the connection state of the optical-receiving unit, the main optical-transmitting unit, the optical-receiving unit, and the redundant optical-transmitting unit according to a control signal; and, a main control unit for outputting a control signal so that the optical-receiving unit can be connected simultaneously to the main optical-transmitting unit and the redundant optical-transmitting unit during a predetermined time.

BRIEF DESCRIPTION OF THE DRAWINGS

The above features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail as they would obscure the invention in unnecessary detail.

Figure 3:
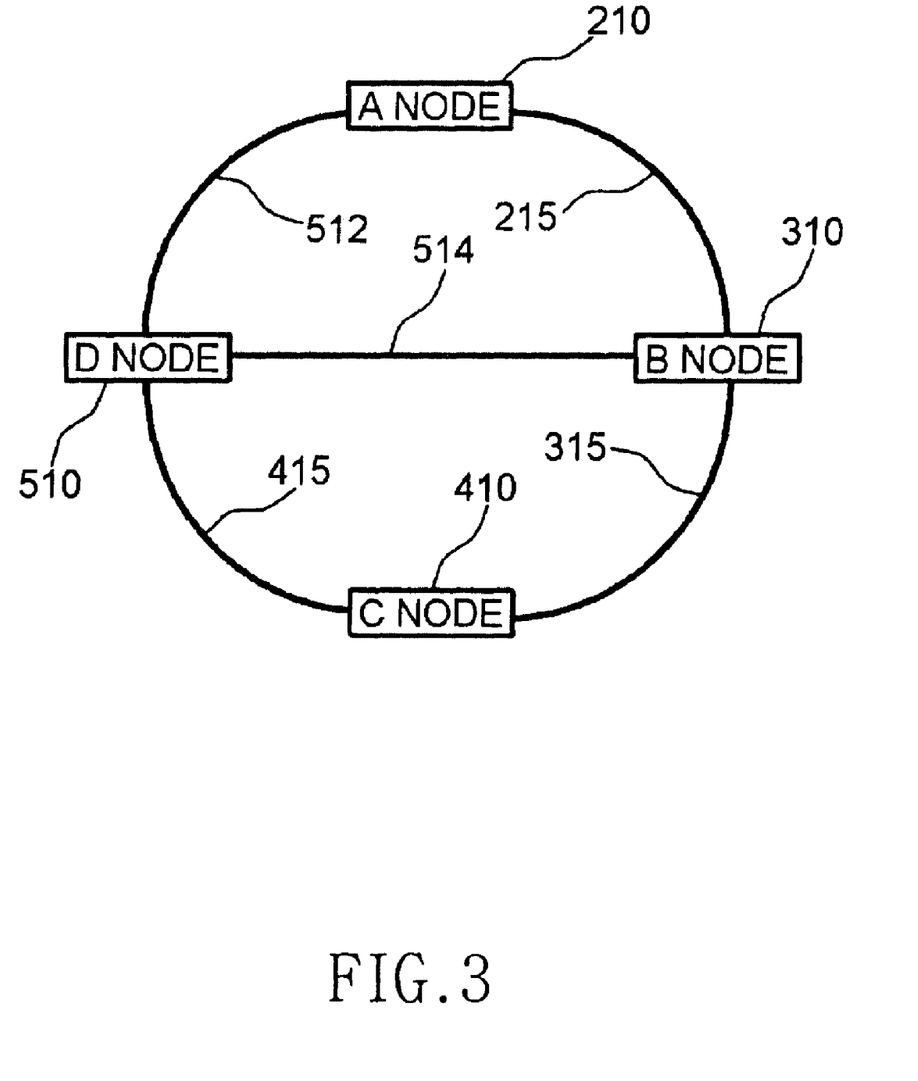
FIG. 3 is a structure illustrating the mesh structure of an optical-communication network for maintaining transparency in accordance with the present invention.

FIG. 3 is a mesh structure illustrating an optical-communication network in accordance with the present invention. The optical-communication network includes four nodes 210, 310, 410, and 510 connected through a bi-directional optical-transmission line 215, 315, 415, 512, or 514. For complete connection, one node 210, 310, 410, and 510 always has at least one optical-transmission path connected to the other nodes. In addition, a photoelectric cross-connect system is included in each node 210, 310, 410, and 510 and has a data-rate recognizing and a clock/data recovery functions, which are used to maintain transparency for a plurality of specific data rates in the event there is an error in the transmission line. Each of the nodes 210, 310, 410, and 510 automatically recognizes an unknown data rate of an input channel and is capable of recovering a clock and data to facilitate the transparency.

Figure 4:
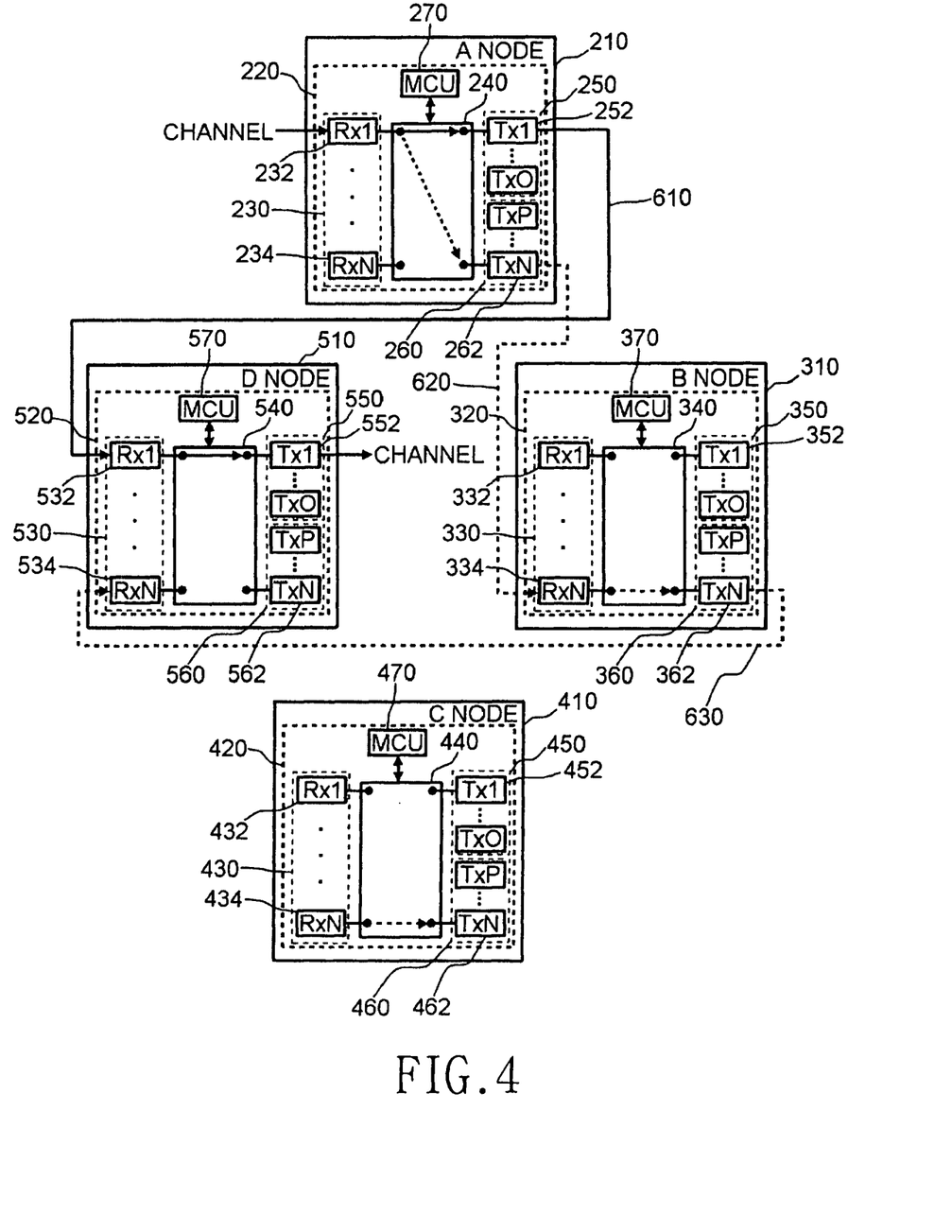
FIG. 4 is an explanatory view showing the communication process during the normal operation of the optical-communication network of FIG. 3.
Figure 5:
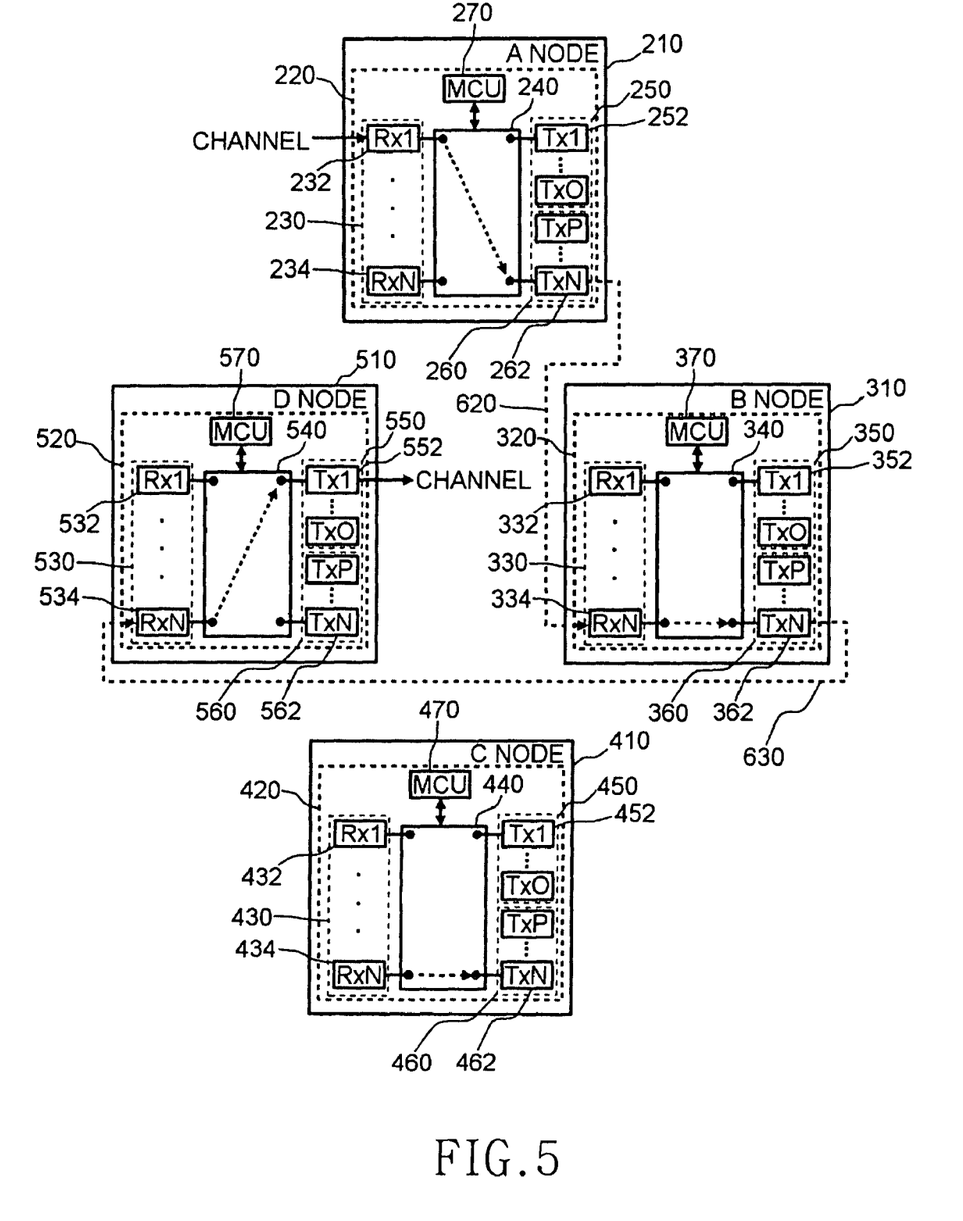
FIG. 5 is an explanatory view showing the communication process when an error is generated in the optical-communication network of FIG. 3; and, FIG. 6 is a structure view illustrating an optical transmitter of FIG. 3.
Figure 6:
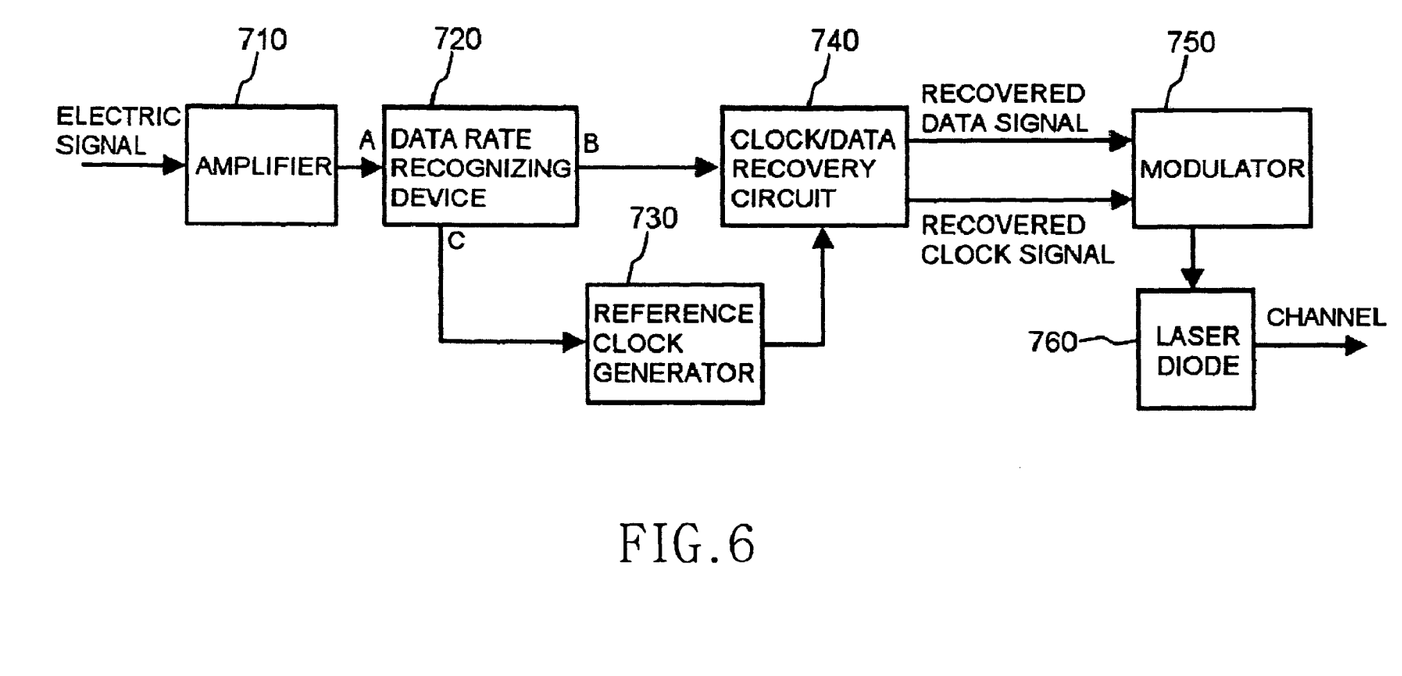

FIG. 4 is an illustrative working-block diagram showing a communication process during the normal operation of the optical-communication network of FIG. 3. FIG. 5 shows the communication process when an error is generated in the optical-communication network of FIG. 3. FIG. 6 is a structure view illustrating an optical transmitter of FIG. 3.

Now, the structure of each node 210, 310, 410, and 510 comprising the optical-communication network will be described now, and the communication process in the normal operation of the optical-communication network will be explained later.

Referring to FIG. 4, the respective nodes 210, 310, 410, and 510 comprising the optical-communication network include photoelectric cross-connect systems 220, 320, 420, and 520 comprised of optical-receiving units 230, 330, 430, and 530; main optical-transmitting units 250, 350, 450, and 550; redundant optical-transmitting units 260, 360, 460, and 560; switches 240, 340, 440, and 540; and, main control units (MCU) 270, 370, 470, and 570. To avoid redundancy, the structure of the node A (210) will be explained as other nodes have the same structure.

In operation, the optical-receiving unit 230 includes a plurality of optical receivers 232 and 234 (i.e., photodiodes) and converts an input signal into an electric signal. The main optical-transmitting unit 250 recognizes the data rate from the inputted electric signal and recovers a clock and data from the recognized data rate, then outputs a light signal modulated according to the recovered clock and data through the main channel.

The redundant optical-transmitting unit 260 recognizes the data rate from the inputted electric signal and also recovers a clock and data in the data rate, then outputs a light signal modulated according to the recovered clock and data through the redundant channel. The main optical-transmitting unit 250 and the redundant optical-transmitting unit 260 include a plurality of optical transmitters 252 and 262, respectively.

Figure 7A:
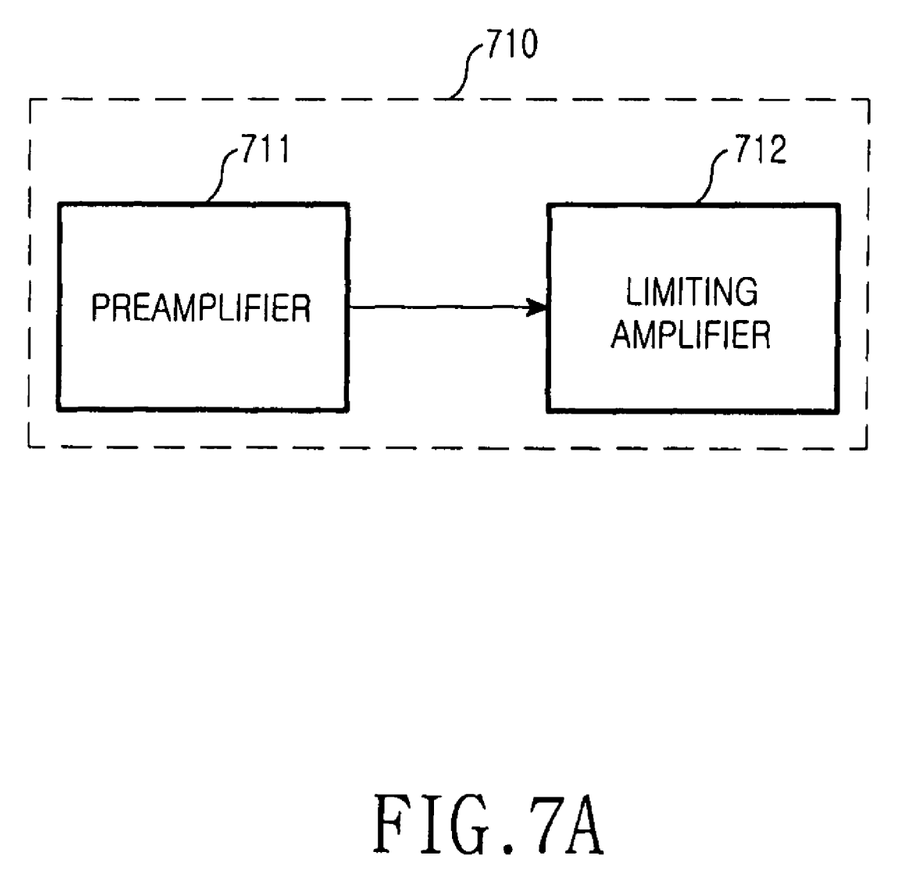
FIGS. 7A and 7B are respective exemplary schematics of an amplifier and a data recognizing device shown in the example of FIG. 6.

Referring to FIG. 6, the optical transmitters 252 and 262 includes an amplifier 710, a data-rate-recognizing device 720, a reference-clock generator 730, a clock/data recovery circuit 740, a modulator 750, and a laser diode 760. As shown in FIG. 7A the amplifier 710 includes a preamplifier 711 for removing noise from the electric signal and amplifies the electric signal at a predetermined ratio. The amplifier 710 further includes a limiting amplifier 712 for re-amplifying the amplified electric signal within a previously-set voltage level and outputs the resulting signal.

Figure 7B:
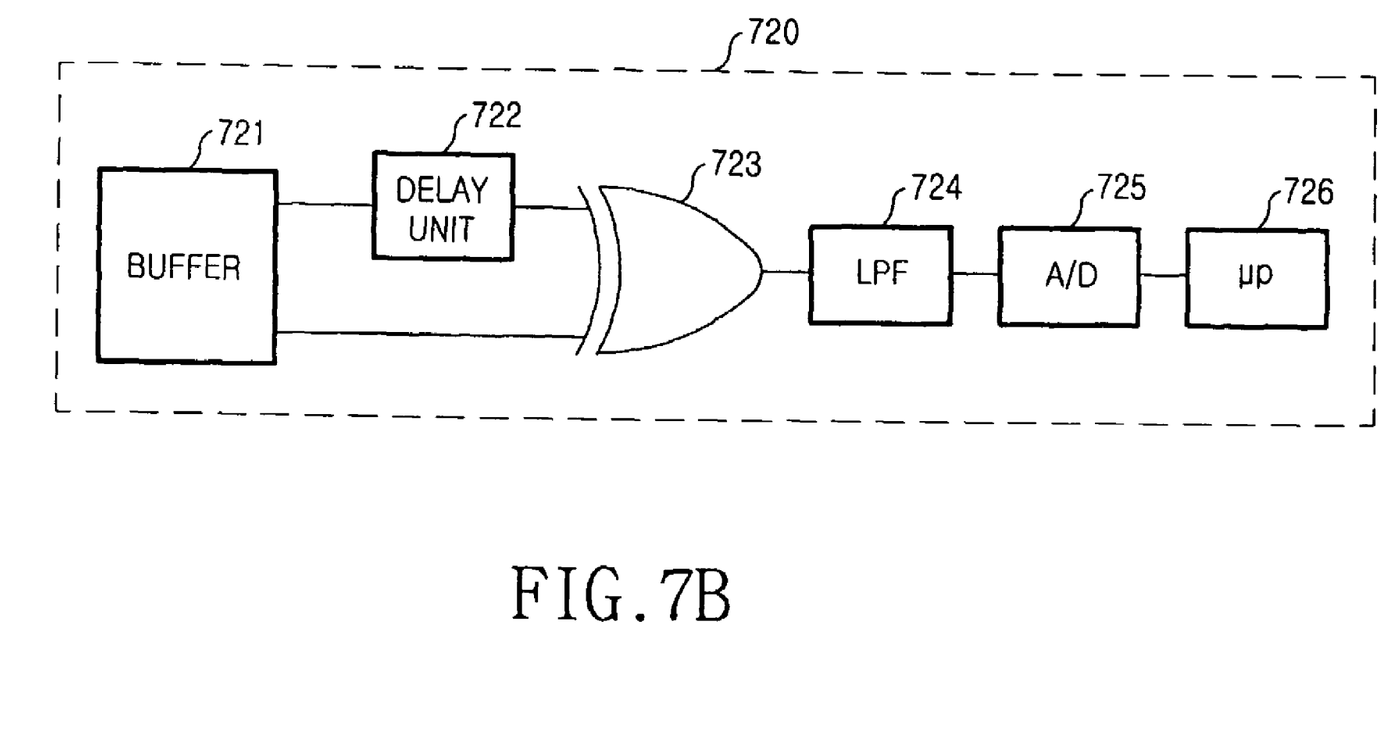

As shown in detail in FIG. 7B, the data-rate-recognizing device 720 includes a buffer 721, a delay unit 722, a computing element 723, a filter 724, an A/D converter 725, and a microprocessor 726. The buffer 721 divides the inputted electric signal into two electric signals, and delays one of the electric signals according to a previously-set time. The computing element 723 EXORs the two electric signals. The EXORed electric signal includes a predetermined number of pulses according to the data rate. The filter 724 performs a low-pass filtering of the EXORed electric signal, and the A/D converter 725 converts the filtered electric signal into a digital one. A voltage level of the filtered electric signal is increased linearly according to the data rate, and therefore the microprocessor recognizes the data rate from the voltage level of the filtered electric signal.

The reference clock generator 730 includes a plurality of oscillators for generating different frequency-clock signals, and operates the internal oscillator selectively to generate a reference clock identical to the data rate recognized by the microprocessor.

The clock/data recovery circuit 740 reproduces a clock and data from the electric signal inputted from the amplifier 710 according to the reference clock generated in the reference-clock generator 730. That is, the clock/data recovery circuit 740 reshapes, regenerates, and re-times the electric signal for reproduction according to the reference clock generated in the reference clock generator 730.

The modulator 750 modulates the light from the laser diode 760 according to the data and clock outputted from the clock/data recovery circuit 240.

The laser diode 760 outputs a predetermined wavelength of light and outputs the light modulated by the modulator 750, namely a channel (main channel or redundant channel).

With continued reference to FIG. 4, the switch 240 adjusts the connection state of the optical-receiving unit 230 and the main optical-transmitting unit 250 and/or the optical-receiving unit 230 and the redundant optical-transmitting unit 260 according to the control signal, and has a multi-tasking function for simultaneously connecting one optical-receiving unit 230 to the main optical-transmitting unit 250 and the redundant optical-transmitting unit 260.

The main control unit 270 detects an error in the optical-transmission line 215 or 512 connected to the adjacent node 310 or 510 through a supervisory channel and transmits information on the management of the photoelectric cross-connect system 220 to the adjacent node 310 or 510. In addition, the main control unit 270 outputs the control signal so that the optical-receiving unit 230 can be connected simultaneously to the main optical-transmitting unit 250 and the redundant optical-transmitting unit 260 for a predetermined time in the normal operation of the optical-communication network. Accordingly, even during the normal operation, the redundant optical-transmitting unit 260 can recognize the at a rate from the inputted electric signal and can set the recognized data rate.

The communication process during the normal operation of the optical-communication network will be explained hereinafter When a signal is inputted through the first optical receiver 232 with a channel having the node D (510) as the destination, the node A outputs the signal, as explained with reference to FIG. 6, via a main channel 610 allocated to the node D (510) using the first optical transmitter 252, which is connected optically to the fourth optical transmission line 512. At this time, the switch 240 of the node A (210) is connected so that the electric signal from the first optical receiver 232 can be inputted simultaneously to the first optical transmitter 252 of the main optical-transmitting unit 250 and the N optical transmitter 262 of the redundant optical-transmitting unit 260. The N optical transmitter 262 recognizes the data rate from the inputted electric signal and sets the recognized data rate, then recovers the clock and data according to the recognized data rate and outputs the light signal modulated according to the recovered clock and data through the redundant channel 620.

The node D (510) receives the signal through the main channel 610, then the switch 540 of the node D (510) connects a first optical receiver 532 connected to receive the main channel 610 to a first optical transmitter 552. At the same time, the node B (310) receives a signal through the redundant channel 620 from the node A (210) via the first optical-transmission line 215 connected to the node A (210), then the switch 340 of the node B (310) connects an N optical receiver 334 connected to receive the redundant channel 620 to an N optical transmitter 362 of the redundant optical-transmitting unit 360. The N optical transmitter 362 of the node B (310) recognizes the data rate from the inputted electric signal and sets the recognized data rate, recovers the clock and data according to the recognized data rate, and outputs the light signal modulated according to the recovered clock and data through a redundant channel 630.

As such, the node D (510) receives a signal thorough the main channel 610 from the node A (210) and the redundant channel 630 from the node B (310), and the switch 540 of the node D (510) connects to the redundant channel 630 of the node B (310). Here, the switch 540 of the node D (510) connects the first optical receiver 520 to the first optical transmitter 552, but does not connect the N optical receiver 534 to the first optical transmitter 552.

FIG. 5 shows the communication process when an error is generated in the optical-communication network of FIG. 3. If there is an error in the transmission, the Node A (210) and/or node D (510) can recognize that the error is generated in the fourth optical-transmission line 512 through the supervisory channel, then each node 210 or 510 notifies the error to the adjacent node 310 or 410 through the supervisory channel. The node A (210) and (or) node D (510) then switch connection of the main channel over to the redundant channel. Thereafter, if the channel having the node D (510) as the destination is inputted through the first optical receiver 232, the node A (210) outputs the data destined to the node D (510) through the redundant channel 620 of the first optical-transmission line 215 using the N optical transmitter 262. At the same time, the N optical transmitter 262 recovers the clock and data according to the recognized data rate determined before the generation of the error and outputs the light signal modulated according to the recovered clock and data through the redundant channel 620. The node B (310) receives the data through the redundant channel 620 of the first optical-transmission line 215 from node A (210),and the switch 340 of the node B (310) connects the N optical receiver 334 connected to receive the redundant channel 620 to the N optical transmitter 362. The N optical transmitter 362 of the note B (310) recovers the clock and data according to the recognized data rate that is determined before the generation of the error and outputs the light signal modulated according to the recovered clock and data through the redundant channel 630. The node D (510) receives data through the redundant channel 630 from the node B (310), and the switch 540 of the node D (510) connects the N optical receiver 534 connected to receive the redundant channel 630 to the first optical transmitter 552.

As discussed earlier, the photoelectric cross-connect system in accordance with the present invention provides the input channel to the redundant optical-transmitting unit during the normal operation using the multicasting function of the switch. As a result, when errors are generated, the data-rate recognition time is removed, thus minimizing the recovery time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A photoelectric cross-connect system used in an optical-communication system having an optical-transmission line having a main channel and a redundant channel connected between a plurality of nodes, each node automatically recognizes a data rate of an input signal and is configured for communication over the redundant channel to communicate with adjacent nodes, comprising:

an optical-receiving unit for receiving and converting an input signal into an electric signal;

an optical-transmitting unit for recovering a clock and data from the converted electric signal extracting a data rate from the electric signal for a subsequent transmission via the main channel;

a redundant-transmitting unit for recovering a clock and data from the converted electric signal and extracting a data rate from the converted electrical signal for a subsequent transmission via the redundant channel;

a switch for selectively adjusting a connection state between the optical-receiving unit and the optical-transmitting unit and between the optical-receiving unit and the redundant-transmitting unit; and, a control unit for outputting the control signal so that the optical-receiving unit can be connected simultaneously to the main transmitting unit and the redundant transmitting unit for a predetermined time period;

wherein the optical-transmitting unit comprises at least one optical transmitter, the optical transmitter comprising:
  a data rate recognizing module for recognizing a data rate of the converted electric signal;
  a reference-clock generator for generating a reference-clock signal identical to the recognized data rate;
  a clock/data recovery circuit for reproducing a clock and data from the converted electric signal according to the reference clock; and,
  a laser diode for outputting an output signal modulated according to the reproduced clock and data; and
  wherein the data-rate-recognizing module comprises:
  a buffer for dividing the converted electrical signal into two signals;
  a delay unit for delaying one of the two signals according to a predetermined time; a
  computing unit for recombining output signals of the delay unit;
  a filter for filtering the recombined signal;
  an A/D converter for converting the filtered signal into a digital signal; and,
  a processor extracting the data rate based on a voltage level of the filtered signal.

2. The system as claimed in claim 1, further comprising an amplifier connected to an input of the data-rate recognizing module.

3. The system as claimed in claim 2, wherein the amplifier comprises:
  a preamplifier for removing noise from the converted electric signal and for amplifying the converted electric signal at a predetermined ratio; and,
  a limiting amplifier for re-amplifying the amplified electric signal within a predetermined voltage level.

4. A photoelectric cross-connect system used in an optical-communication system having an optical-transmission line having a main channel and a redundant channel connected between a plurality of nodes, each node automatically recognizes a data rate of an input signal and is configured for communication over the redundant channel to communicate with adjacent nodes, comprising:
  an optical-receiving unit for receiving and converting an input signal into an electric signal;
  an optical-transmitting unit for recovering a clock and data from the converted electric signal extracting a data rate from the electric signal for a subsequent transmission via the main channel;
  a redundant-transmitting unit for recovering a clock and data from the converted electric signal and extracting a data rate from the converted electrical signal for a subsequent transmission via the redundant channel;
  a switch for selectively adjusting a connection state between the optical-receiving unit and the optical-transmitting unit and between the optical-receiving unit and the redundant-transmitting unit; and,
  a control unit for outputting the control signal so that the optical-receiving unit can be connected simultaneously to the main transmitting unit and the redundant transmitting unit for a predetermined time period;
  wherein the redundant-transmitting unit comprises at least one optical transmitter, the optical transmitter comprising:
  a data-rate-recognizing module for recognizing a data rate of the converted electric signal;
  a reference-clock generator for generating a reference clock identical to the recognized data rate;
  a clock/data recovery circuit for reproducing a clock and data from the converted electric signal according to the reference clock; and,
  a laser diode for outputting an output signal modulated according to the reproduced clock and data; and
  wherein the data-rate-recognizing module comprises:
  a buffer for dividing the converted electrical signal into two signals;
  a delay unit for delaying one of the two signals according to a predetermined time; a
  computing unit for recombining output signals of the delay unit;
  a filter for filtering the recombined signal;
  an A/D converter for converting the filtered signal into a digital signal; and,
  a processor extracting the data rate based on a voltage level of the filtered signal.

5. The system as claimed in claim 4, further comprising an amplifier connected to an input of the data-rate-recognizing module.

6. The system as claimed in claim 5, wherein the amplifier comprises:
  a preamplifier for removing noise from the converted electric signal and for amplifying the converted electric signal at a predetermined ratio; and,
  a limiting amplifier for re-amplifying the amplified electric signal within a predetermined voltage level.

* * * * *